United States Patent
Miyazawa

(10) Patent No.: US 7,889,952 B2
(45) Date of Patent: Feb. 15, 2011

(54) INFORMATION PROCESSING DEVICE, INFORMATION PROCESSING PROGRAM, AND RECORDING MEDIUM FOR THE SAME

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 880 days.

(21) Appl. No.: 11/779,364

(22) Filed: Jul. 18, 2007

(65) Prior Publication Data

US 2008/0055329 A1    Mar. 6, 2008

(30) Foreign Application Priority Data

Sep. 1, 2006   (JP) ............... 2006-237371

(51) Int. Cl.
G06K 9/40 (2006.01)
G03B 21/26 (2006.01)

(52) U.S. Cl. .................. 382/304; 382/254; 353/30

(58) Field of Classification Search ......... 382/254–275, 382/302–304; 353/30–31, 34, 44, 48; 345/1.1–1.3, 345/2.1–2.2, 4–9
See application file for complete search history.

(56) References Cited

U.S. PATENT DOCUMENTS

| | | | |
|---|---|---|---|
| 6,377,306 B1 * | 4/2002 | Johnson et al. | 348/383 |
| 7,079,157 B2 * | 7/2006 | Deering | 345/613 |
| 7,738,036 B2 * | 6/2010 | Nijim et al. | 348/383 |
| 2005/0110959 A1 * | 5/2005 | Miyazawa et al. | 353/94 |
| 2005/0117126 A1 * | 6/2005 | Miyazawa et al. | 353/94 |
| 2005/0146644 A1 * | 7/2005 | Miyazawa et al. | 348/745 |
| 2008/0042922 A1 * | 2/2008 | Miyazawa | 345/1.2 |
| 2008/0143969 A1 * | 6/2008 | Aufranc et al. | 353/30 |

FOREIGN PATENT DOCUMENTS

| | | |
|---|---|---|
| JP | A-2004-069996 | 3/2004 |
| JP | A-2006-235158 | 9/2006 |

\* cited by examiner

*Primary Examiner*—Manav Seth
(74) *Attorney, Agent, or Firm*—Oliff & Berridge, PLC

(57) ABSTRACT

An information processing device that includes: a correction parameter storage unit that stores therein an individual correction parameter for each of a plurality of projectors connected to the information processing device for use to individually perform an image correction process of enabling appropriate image display by each of the projectors; a correction parameter combination process unit that calculates a combined correction parameter by combining together the individual correction parameters for the projectors; a combined correction image data generation unit that generates combined correction image data by performing the image correction process with respect to an incoming image source based on the combined correction parameter; and an image data transmission unit that transmits the combined correction image data to any of the projectors.

6 Claims, 19 Drawing Sheets

INFORMATION PROCESSING DEVICE, INFORMATION PROCESSING PROGRAM, AND RECORDING MEDIUM FOR THE SAME

BACKGROUND

1. Technical Field

The present invention relates to an information processing device, an information processing program, and a recording medium therefor.

2. Related Art

A projection system of previous type performs image correction with respect to any image source provided to a personal computer (PC) serving as an information processing device. The image correction is exemplified by shape correction and tone correction, and is performed in an image processing section of the PC. The resulting image data being the result of image correction is projected by a projector onto a screen. As an example, refer to Patent Document 1 (JP-A-2004-69996).

Note that the image data being the result of the image correction in the image processing section of the PC is transmitted to the projector over a USB cable or others.

The image correction includes trapezoid correction (shape conversion), γ correction, VT-γ correction, color unevenness correction, ghost correction, crosstalk correction, and the like. The trapezoid correction is of correcting any trapezoidal distortion possibly resulted from the positional relationship between a projector and a screen. The γ correction and VT-γ correction are both color correction to be performed in accordance with the output characteristics of the projector. The color unevenness correction is of correcting any brightness and color unevenness that is caused by the characteristics of a liquid crystal panel. The ghost correction and the crosstalk correction are those of correcting any color unevenness, e.g., ghost and crosstalk, caused due to possible influence of a drive signal over neighboring pixels of a liquid crystal panel at the time of driving the pixels thereof.

With such a configuration, the image correction is mainly performed on the PC, and thus the projector is only required to simply project the image data without going through the complicated image correction so that the configuration of the projector can be simplified very much. Because the PC is originally capable of image correction, there thus is no need to specially provide the PC with any new function to perform image correction with high accuracy.

There are recently many various projection methods such as stack projection. With stack projection, display images of two or more projectors are overlaid one on the other so that the resulting image is of high brightness.

The issue here is that with the technology of Patent Document 1 for such stack projection, the load possibly imposed on the PC becomes considerably large because the image data for transmission to a plurality of projectors is subjected to image correction in the image processing section of the PC. This resultantly requires the PC to be enhanced in performance or be used plurally.

SUMMARY

An advantage of some aspects of the invention is to provide an information processing device and program that can contribute to simplify the configuration of a plurality of projectors for use for stack projection, and reduce the load possibly imposed on the information processing device, and a recording medium therefor.

According to an aspect of the invention, an information processing device that includes: a correction parameter storage unit that stores therein an individual correction parameter for each of a plurality of projectors connected to the information processing device for use to individually perform an image correction process of enabling appropriate image display by each of the projectors; a correction parameter combination process unit that calculates a combined correction parameter by combining together the individual correction parameters for the projectors; a combined correction image data generation unit that generates combined correction image data by performing the image correction process with respect to an incoming image source based on the combined correction parameter; and an image data transmission unit that transmits the combined correction image data to any of the projectors.

With such a configuration, the correction parameter combination process unit calculates a combined correction parameter by combining together individual correction parameters for use to individually perform an image correction process of enabling appropriate image display by each of the projectors, and the combined correction image data generation unit performs the image correction process based on thus calculated combined correction parameter so that combined correction image data can be generated.

As such, for stack projection using a plurality of projectors, the combined correction image data is transmitted to any of the projectors so that the projector accordingly projects the combined correction image data factored with the image correction applied to every projector. Therefore, even if any other projectors project image data being close to an image source through with almost no image correction, the resulting stack projection can be of an appropriate level.

What is more, the projectors simply project the image data with no complicated image correction so that the configuration of the projectors can be simplified, and the image correction can be performed all at once based on the combined correction parameter. As such, the load to be imposed on the information processing device can be also reduced.

In the aspect of the invention, preferably, the correction parameter storage unit stores therein a common correction parameter for use to commonly perform the image correction process of enabling appropriate image display by each of the projectors, a common correction image data generation unit is included for generating common correction image data by performing the image correction process with respect to the image source based on the common correction parameter, and the image data transmission unit transmits the common correction image data to any of the projectors that is not provided with the combined correction image data.

With such a configuration, the common correction image data generation unit performs the image correction with respect to the image source based on the common correction parameter so that the common correction image data can be generated.

This accordingly enables to perform all at once the image correction commonly to a plurality of projectors for appropriate image display, thereby favorably reducing, to a further extent, the load to be imposed on the information processing device.

In the aspect of the invention, preferably, the correction parameter storage unit stores therein the individual correction parameter not being a combination result of the correction parameter combination process unit, an individual correction image data generation unit is included for generating, with respect to the image source, individual correction image data for each of the projectors based on the individual correction parameter not being the combination result of the correction parameter combination process unit, and the image data transmission unit transmits the individual correction image data generated for each of the projectors to any of the projectors not provided with the combined correction data.

With such a configuration, the individual correction image data generation unit performs the image correction with respect to the image source based on any individual correction parameter not being the combination result of the correction parameter combination process unit so that the individual correction image data can be generated.

As such, by any of the projectors not provided with the combined correction data projecting the individual correction image data, even if the correction parameter combination process unit calculates a combined correction parameter by simply combining the individual correction parameters for the projectors, i.e., even if any one of the projectors cannot project the combined correction image data adequately factored with the image correction applied to every projector, the resulting image correction can be performed with a sufficient level.

What is more, compared with any image data being close to an image source through with almost no image correction, the individual correction image data is not large in amount that much, and the image data is not reduced in transmission speed.

In the aspect of the invention, preferably, the correction parameter storage unit stores therein a common correction parameter for use to commonly perform the image correction process of enabling appropriate image display by each of the projectors, and the individual correction parameter not being the combination result of the correction parameter combination process unit, a common correction image data generation unit is included for generating common correction image data by performing the image correction process with respect to the image source based on the common correction parameter, an individual correction data generation unit that generates individual correction image data for each of the projectors based on the individual correction parameter not being a combination result of the correction parameter combination process unit with respect to the common correction image data generated by the common correction image data generation unit, and the image data transmission unit transmits the individual correction image data generated for each of the projectors to any of the projectors not provided with the combined correction data.

With such a configuration, the individual image correction data generation unit is allowed to generate, with respect to the common image correction data generated by the common image correction data generation unit, the individual correction image data for each of the projectors based on the individual correction parameter not being the combination result of the correction parameter combination process unit.

This accordingly enables to perform all at once the image correction commonly to a plurality of projectors for appropriate image display, thereby favorably reducing the load to be imposed on the information processing device to a further degree. Even if it is not possible to project the combined correction image data adequately factored with the image correction applied to every projector, the resulting image correction can be performed with an appropriate level.

In the aspect of the invention, preferably, the individual correction parameter not being the combination result of the correction parameter combination process unit is for shape conversion correction, VT-γ correction, ghost correction, or crosstalk correction.

The correction parameter for use for shape conversion, VT-γ correction, ghost correction, or crosstalk correction often takes an extreme value. As such, there may be a case where, even if the correction parameter combination process unit calculates a combined correction parameter by simply combining the individual correction parameters for the projectors, any one of the projectors may not be able to project the combined correction image data adequately factored with the image correction applied to every projector.

With the above configuration, however, based on the correction parameter for use for shape conversion, VT-γ correction, ghost correction, or crosstalk correction, individual correction image data can be generated for each of the projectors.

Accordingly, even if it is not possible to project the combined correction image data adequately factored with the image correction applied to every projector, the resulting image correction can be performed with an appropriate level.

According to another aspect of the invention, an information processing program for use in an information processing device, including: storing, by the information processing device, an individual correction parameter for each of a plurality of projectors connected to the information processing device for use to individually perform an image correction process of enabling appropriate image display by each of the projectors; calculating, by the information processing device, a combined correction parameter by combining together the individual correction parameters for the projectors; generating, by the information processing device, combined correction image data by performing the image correction process with respect to an incoming image source based on the combined correction parameter; and transmitting, by the information processing device, the combined correction image data to any of the projectors.

Such a configuration enables to derive the effects and advantages similar to those of the information processing device described above.

According to still another aspect of the invention, there is provided a computer-readable recording medium carrying therein the information processing program described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the below, embodiments of the invention are described by referring to the accompanying drawings.

First Embodiment

Described now is a projection system in a first embodiment of the invention.

Figure 1:
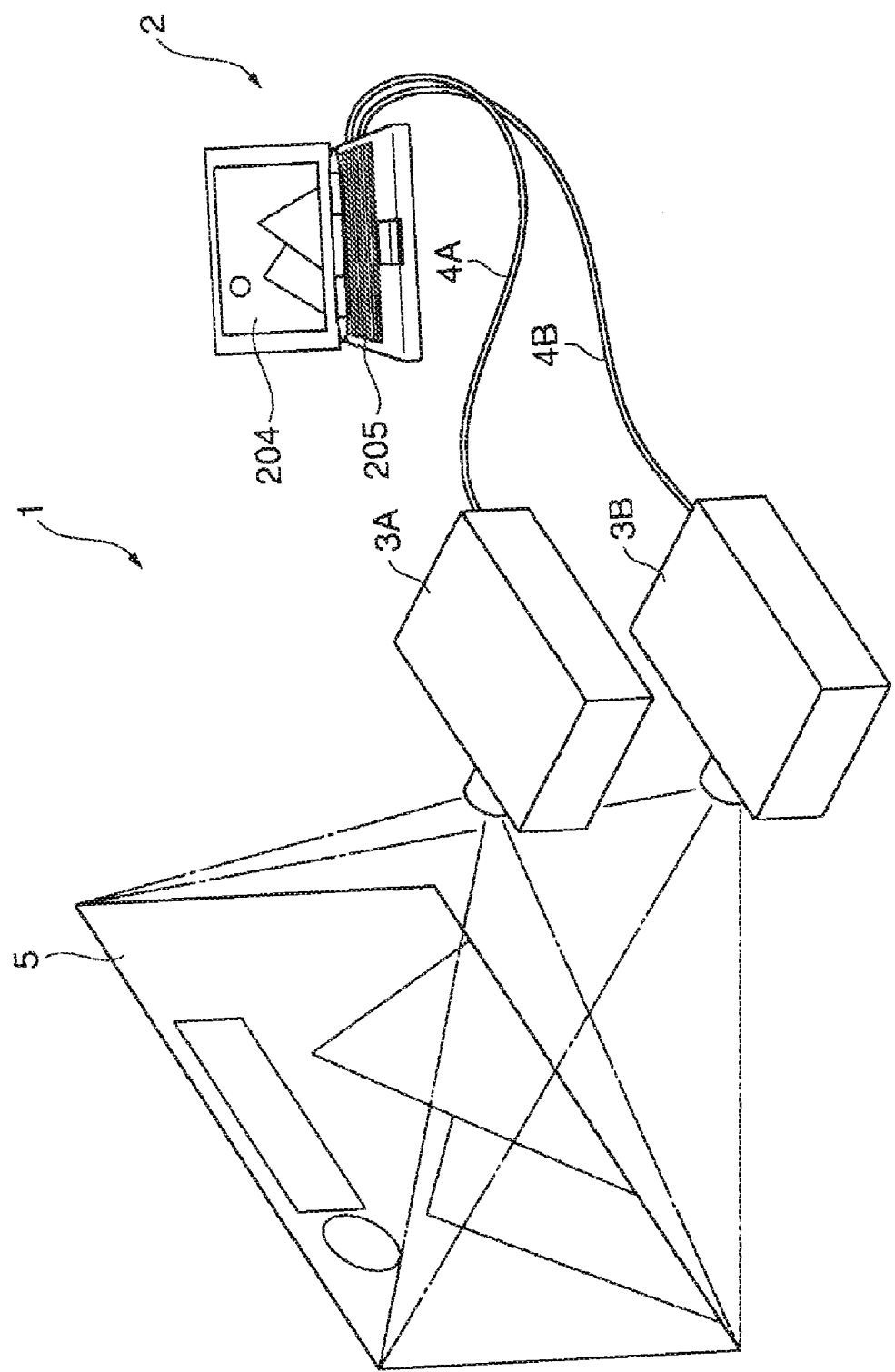
FIG. 1 is a diagram showing the external view of a projection system in a first embodiment of the invention.

As shown in FIG. 1, a projection system 1 of the embodiment is a stack projection system, displaying images projected by two projectors on the same projection area with overlay on one on the other.

The projection system 1 is configured to include a personal computer (PC), i.e., information processing device, 2, two projectors 3A and 3B, and USB (Universal Serial Bus) cables 4A and 4B.

The projectors 3A and 3B each modulate luminous fluxes coming from a light source, and subject the resulting luminous fluxes to extended projection so that an image is displayed on a screen 5. The modulation is performed based on image data generated by the PC 2.

The PC 2 and the projector 3A are connected together via the USB cable 4A, and the PC 2 and the projector 3B are connected together via the USB cable 4B.

Figure 2:
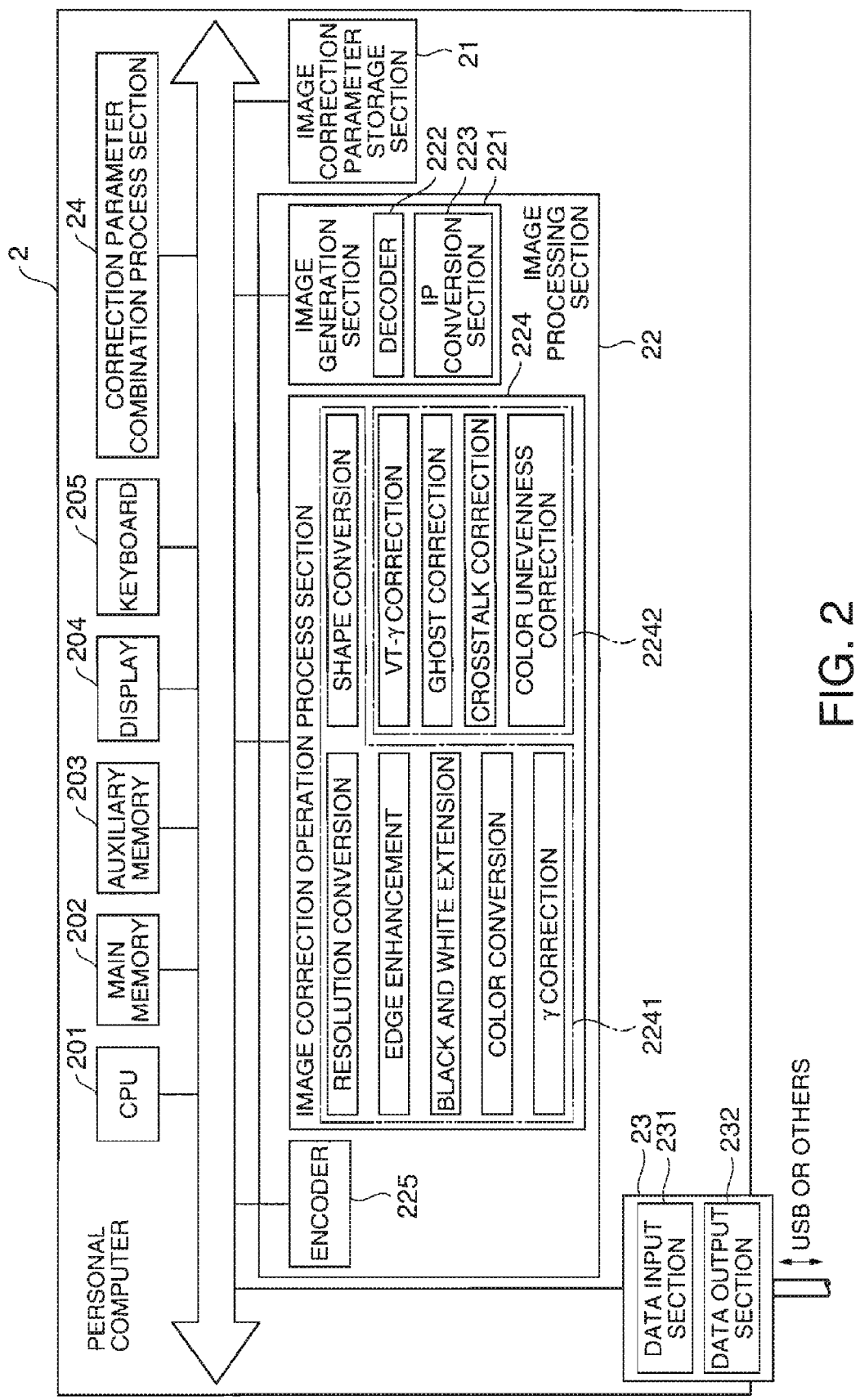
FIG. 2 is a function block diagram of a personal computer in the first embodiment.

As shown in FIG. 2, the PC 2 is configured to include a CPU (Central Processing Unit) 201, a main memory 202, an auxiliary memory 203, a display 204, a keyboard 205, an image correction parameter storage section, i.e., the correction parameter storage unit, 21, an image processing section 22, an USB connector 23, and a correction parameter combination process section, i.e., the correction parameter combination process unit, 24.

The auxiliary memory 203 is a medium such as DVD (Digital Versatile Disc) or others recorded with digital data, e.g., video (image source) and audio.

The image correction parameter storage section 21 stores therein a correction parameter for use for image correction needed for appropriate image display by the projectors 3A and 3B.

The correction parameter for storage in the image correction parameter storage section 21 includes a common correction parameter and an individual correction parameter. The common correction parameter is used for image correction commonly applied to a plurality of projectors for their appropriate image display, e.g., for image correction applied in accordance with the projector type. The individual correction parameter is used for image correction individually and appropriately applied to each of the projectors.

Alternatively, the image correction parameter storage section 21 may store therein correction parameters through installation of a memory card or CD-ROM (Compact Disc Read-Only Memory) recorded with the correction parameters, i.e., the memory card or CD-ROM is inserted into the PC 2.

Still alternatively, the image correction parameter storage section 21 may store therein any predetermined correction parameters when connections are established between the PC 2 and the projectors 3A and 3B via the USB cables 4A and 4B, respectively. The predetermined correction parameters here are those acquired by the PC 2 from the projectors.

Still alternatively, the image correction parameter storage section 21 may store therein correction parameters acquired by the PC 2 from a server or others on a network when the PC 2 is connected to the network.

The correction parameter combination process section 24 combines (adds in this embodiment) the individual correction parameters stored in the image correction parameter storage section 21 so that a combined correction parameter is calculated.

Note here that the image correction parameter storage section 21 stores therein also the combined correction parameter being the calculation result of the correction parameter combination process section 24.

By referring to FIGS. 3A to 4B, the operation of the correction parameter combination process section 24 is described in detail.

Figure 3A:
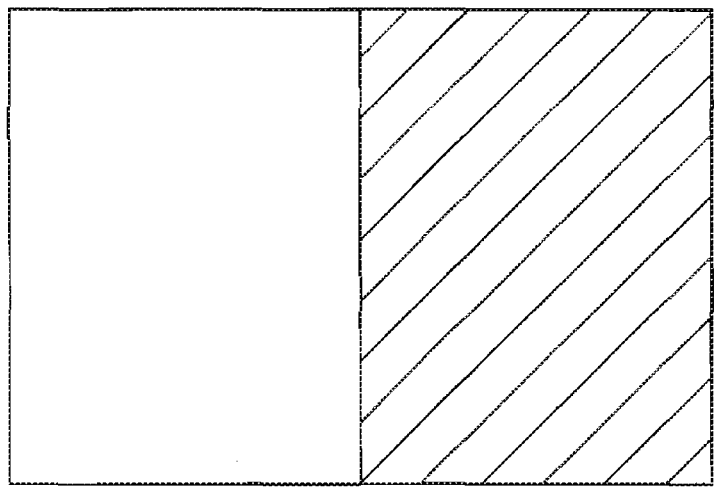
FIGS. 3A and 3B are both a diagram showing an exemplary individual correction parameter in the first embodiment.
Figure 3B:
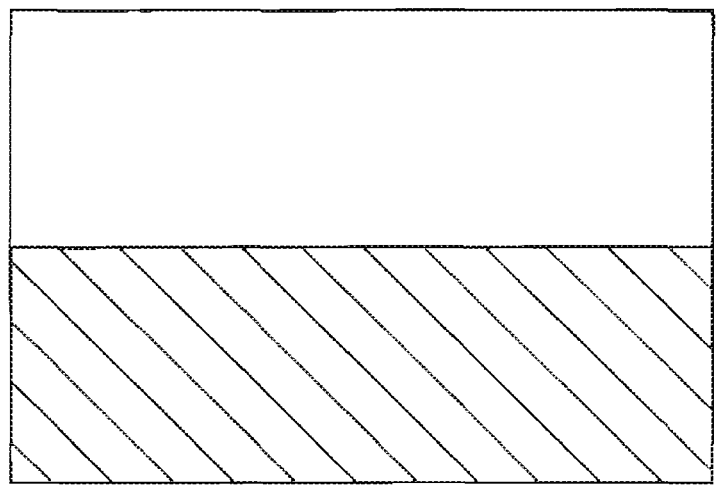

FIG. 3A shows an individual correction parameter for use to perform color unevenness correction related to the projector 3A, and FIG. 3B shows an individual correction parameter for use to perform color unevenness correction related to the projector 3B, for example. In FIGS. 3A and 3B, the shaded portions are presumably those for brightness correction by 1 in the image data, for example.

Figure 4A:
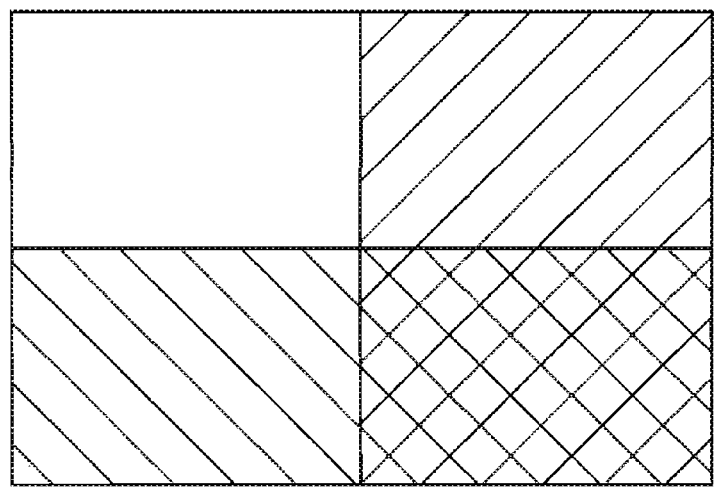
FIGS. 4A and 4B are diagrams showing an exemplary combined correction parameter and a common correction parameter, respectively, in the first embodiment.

The correction parameter combination process section 24 combines the individual correction parameters of FIGS. 3A and 3B, and FIG. 4A shows the combination result, i.e., combined correction parameter.

In this embodiment, the correction parameter combination process section 24 combines the individual correction parameters through addition. Therefore, the double-shaded portion in FIG. 4A is that for brightness correction by 2 in the image data.

As shown in FIG. 2, the image processing section 22 is configured to include an image generation section 221, an image correction operation process section 224, and an encoder 225.

The image generation section 221 is configured to include a decoder 222 and an IP (Interlace Progressive) conversion section 223. The image generation section 221 decodes an image source read from the auxiliary memory 203 in accordance with the recording format thereof, thereby decoding the image data on a frame basis.

The decoder 222 decodes the image source encoded in MPEG (Motion Picture Experts Group)-2 or others so that the image data is generated.

The IP conversion section 223 converts an interlaced image source such as NTSC (National Television System Committee) and PAL (Phase Alternation by Line) into progressive image data for use for a fixed-pixel display device such as liquid crystal panel.

The image correction operation process section 224 is configured to include a common correction image data generation section (common correction image data generation unit) 2241 and a combined correction image data generation section (combined correction image data generation unit) 2242.

The common correction image data generation section 2241 applies image correction to the image data being the decoding result of the image generation section 221 so that common correction image data is generated. This image correction is applied based on a common correction parameter.

Figure 4B:
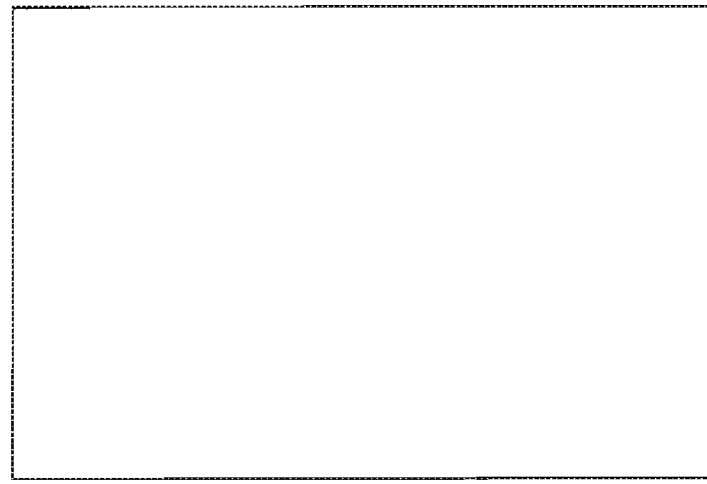

Note here that when the common correction parameter is the one shown in FIG. 4B, no image correction is applied based on the common correction parameter.

The combined correction image data generation section 2242 applies image correction to the common correction image data so that combined correction image data is generated. This image correction is applied based on the combined correction parameter, e.g., FIG. 4A, being the combination result of the correction parameter combination process section 24.

In this embodiment, the common correction parameter corresponds to a correction parameter for resolution conversion, edge enhancement, black and white extension, color conversion, γ correction, or shape conversion.

The individual correction parameter corresponds to a correction parameter for VT-γ correction, ghost correction, crosstalk correction, or color unevenness correction.

Note that, with some configuration of the projector, any color unevenness caused due to possible influence of neighboring pixels is referred to as crosstalk or ghost. The crosstalk denotes unevenness of an image caused by pixels being driven by the leakage current of a signal for the adjacent pixels, and the ghost denotes the phenomenon in which a video looks overlapped due to displacement.

The encoder 225 calculates a difference between image frames of the correction image data being the result of image correction by the image correction operation process section 224, and detects any portion with a change as differential data.

The encoder 225 also encodes the differential data being the detection result into a format allowing the transmission by the USB cables 4A and 4B, e.g., USB 2.0.

The USB connector 23 is configured to include a data input section 231 and a data output section 232, and takes charge of data input and output among the PC 2 and the projectors 3A and 3B over the USB cables 4A and 4B.

In this embodiment, the PC 2 transmits the combined correction image data to the projector 3A over the USB cable 4A, and transmits the common correction image data to the projector 3B over the USB cable 4B.

Also in the embodiment, the image data transmission unit is configured to include the encoder 225 and the USB connector 23.

Described next is the configuration of the projectors 3A and 3B.

Figure 5:
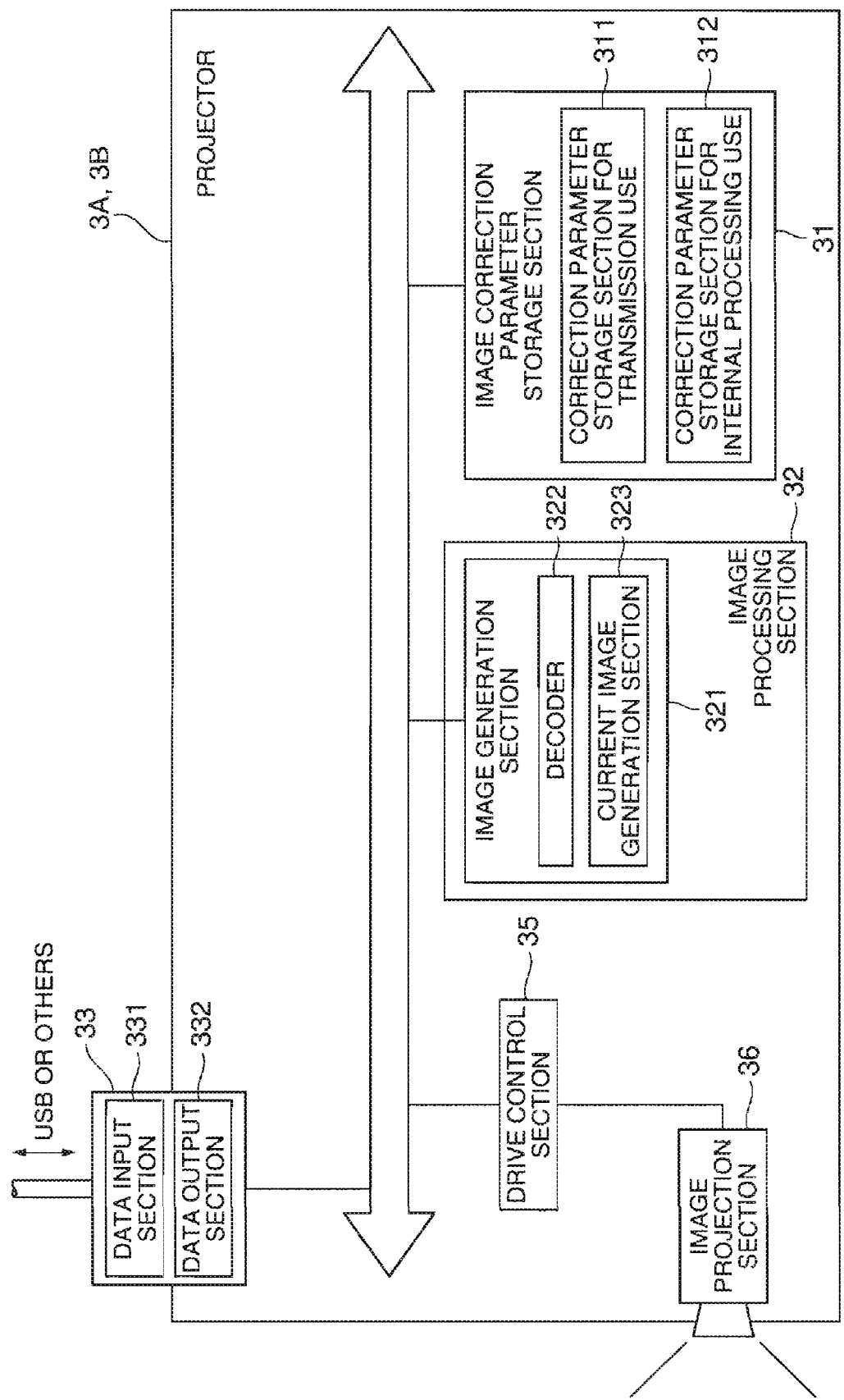
FIG. 5 is a function block diagram of a projector in the first embodiment.

As shown in FIG. 5, the projectors 3A and 3B are each configured to include an image correction parameter storage section 31, an image processing section 32, a USB connector 33, a drive control section 35, and an image projection section 36.

The image correction parameter storage section 31 is configured to include a correction parameter storage section 311 for transmission use, and a correction parameter storage section 312 for internal processing use.

The correction parameter storage section 311 stores therein the common correction parameters. That is, in this embodiment, the correction parameter storage section 311 stores therein the correction parameters for use of resolution conversion, edge enhancement, black and white extension, color conversion, γ correction, and shape conversion.

The correction parameter storage section 312 stores therein the individual correction parameters. That is, in this embodiment, the correction parameter storage section 312 stores therein the correction parameters for use of VT-γ correction, ghost correction, crosstalk correction, and color unevenness correction.

As described in the foregoing, the image correction parameter storage section 21 of the PC 2 stores therein the common correction parameter(s) and the individual correction parameter(s) when the PC 2 is connected to the projectors 3A and 3B via the USB cables 4A and 4B, respectively. The common correction parameter(s) and the individual correction parameter(s) here are those acquired by the PC 2 from the projector 3A, i.e., the correction parameter storage sections 311 and 312, over the USB cable 4A.

The image correction parameter storage section 21 of the PC 2 also stores therein the individual correction parameter(s) when the PC 2 is connected to the projector 3B via the USB cable 4B. The individual correction parameter(s) here are those acquired by the PC 2 from the projector 3B, i.e., the correction parameter storage section 312, over the USB cable 4B.

That is, the image correction parameter storage section 21 of the PC 2 stores therein the common correction parameter(s), the individual correction parameter(s) related to the projector 3A, and the individual correction parameter(s) related to the projector 3B.

The image processing section 32 is configured to include an image generation section 321.

The image generation section 321 is configured to include a decoder 322 and a current image generation section 323.

The decoder 322 decodes the differential data coming from the PC 2 after encoding. That is, because the differential data coming from the PC 2 has been encoded by the encoder 225, decoding the data by the decoder 322 will derive the differential data.

The current image generation section 323 combines the differential data being the decoding result with the currently-projected image data, thereby generating a new current image frame.

The drive control section 35 forwards a control signal for driving the image projection section 36 to make it display thereon the current image frame.

Figure 6:
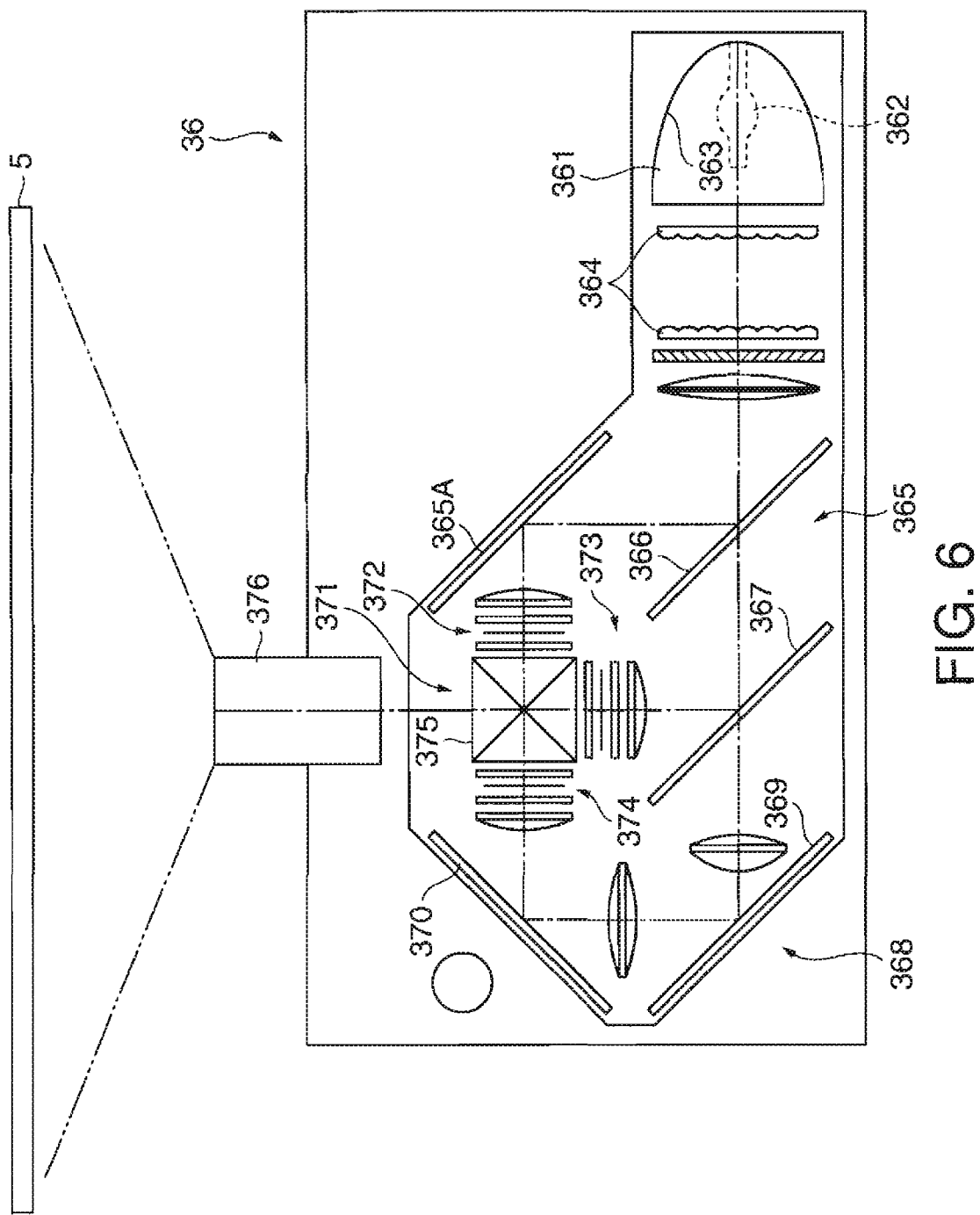
FIG. 6 is a diagram showing the configuration of an image projection section of the projector.

As shown in FIG. 6, the image projection section 36 is configured to include a light source section 361. A light coming from the light source section 362 is collimated by a reflector 363, and the resulting collimated luminous flux is directed to a color separation system 365 after going through two lens arrays 364 and 364.

The color separation system 365 is configured to include dichroic mirrors 366 and 367, and separates a light into three colors of red, green, and blue. The dichroic mirror 366 reflects the light of red, and passes through the lights of blue and green. The dichroic mirror 367 reflects the light of green, and passes through the light of blue.

The light of red is reflected by a reflective mirror 365A, the color of green is reflected by the dichroic mirror 367, and the light of blue is guided to a relay system 368 provided with two reflective mirrors 369 and 370. These lights of red, green, and blue then enter an electrooptic device 371, i.e., a liquid crystal panel (light modulator) 372 for red color, a liquid crystal panel (light modulator) 373 for green color, and a liquid crystal panel (light modulator) 374 for blue color, respectively. The lights of three colors are respectively subjected to predetermined modulation in the liquid crystal panels 372 to 374 in accordance with image information, and then are combined in a prism 375.

The resulting combined image is emitted from a projection system 376, and then is extended and projected on the screen 5.

The USB connector 33 is configured to include a data input section 331 and a data output section 332, and take charge of data input and output among the PC 2 and the projectors 3A and 3B over the USB cables 4A and 4B.

Described next is the operation of the projection system 1 of the first embodiment by referring to the flowchart of FIG. 7, and FIG. 8.

Figure 7:
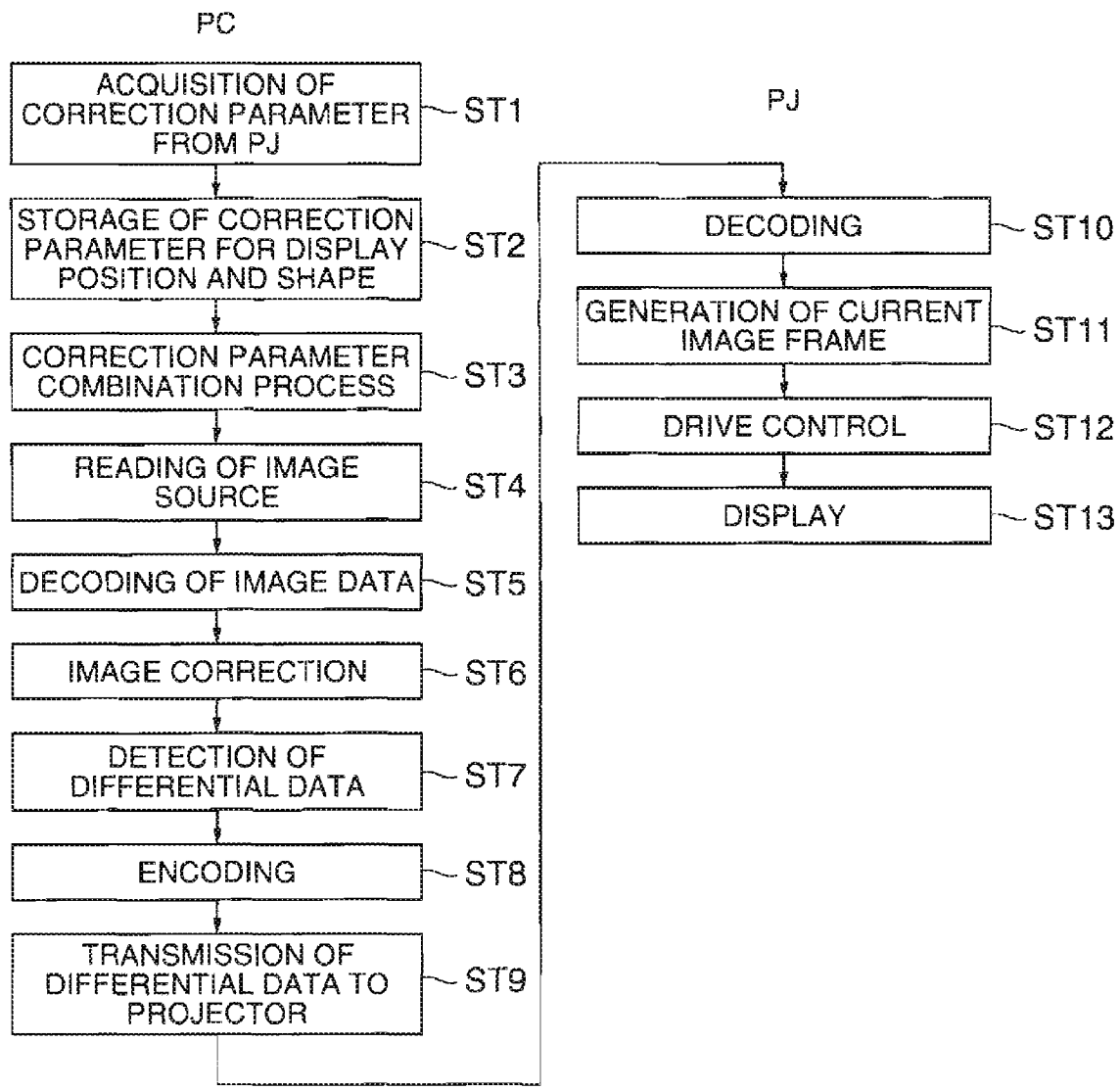
FIG. 7 is a flowchart of the operation of the projection system in the first embodiment.

In FIG. 7, ST1 to ST9 on the left side indicate the operation of the PC 2, and ST10 to ST13 on the right side indicate the operation of the projectors (PJ) 3A and 3B.

When a user of the projection system 1 establishes connections among the PC 2 and the projectors 3A and 3B, the PC 2 accordingly goes through the following ST1 to ST9.

Note here that a program for operating the PC 2 is stored in the main memory 202 of the PC 2.

First of all, when the PC 2 is connected to the projectors 3A and 3B, the PC 2 receives equipment information from each of the projectors.

In ST1, the PC 2 reads a common correction parameter and an individual correction parameter from the correction parameter storage sections 311 and 312, and acquires these parameters over the USB cable 4A.

The PC 2 also reads an individual correction parameter from the correction parameter storage section 312 of the projector 3B, and acquires the parameter over the USB cable 4B.

The image correction parameter storage section 21 then stores therein the correction parameters acquired by the PC 2 as such.

Then in ST2, the image correction parameter storage section 21 stores therein a common correction parameter, i.e., a correction parameter for use at the time of stack projection by the projectors 3A and 3B, i.e., for shape conversion based on the adjustment made to the display position and shape. When image correction is required due to any common cause, e.g., tilting screen, the correction parameter for shape conversion can be regarded as the common correction parameter.

In this embodiment, presumably, a user of the projection system 1 is already done with the adjustment of the display position and shape when the projectors 3A and 3B perform stack projection.

In this embodiment, the procedure of correction parameter storage includes ST1 and ST2.

Then in ST3 (procedure of correction parameter combination process), the correction parameter combination process section 24 combines the individual correction parameters stored in the image correction parameter storage section 21 so that a combined correction parameter is calculated.

Then in ST4, the image generation section 221 reads an image source from the auxiliary memory 203, e.g., DVD.

Then in ST5, the decoder 222 decodes an image source that has been encoded in MPEG-2 so that image data is generated.

Then in ST6, the common correction image data generation section 2241 applies image correction to the image data being the decoding result of the image generation section 221 so that common correction image data is generated. This image correction is applied based on the common correction parameter stored in the image correction parameter storage section 21. The combined correction image data generation section 2242 applies image correction to the common correction image data so that combined correction image data is generated (procedure of combined correction image data generation). This image correction is applied based on the combined correction parameter being the combination result of the correction parameter combination process section 24.

Figure 8:
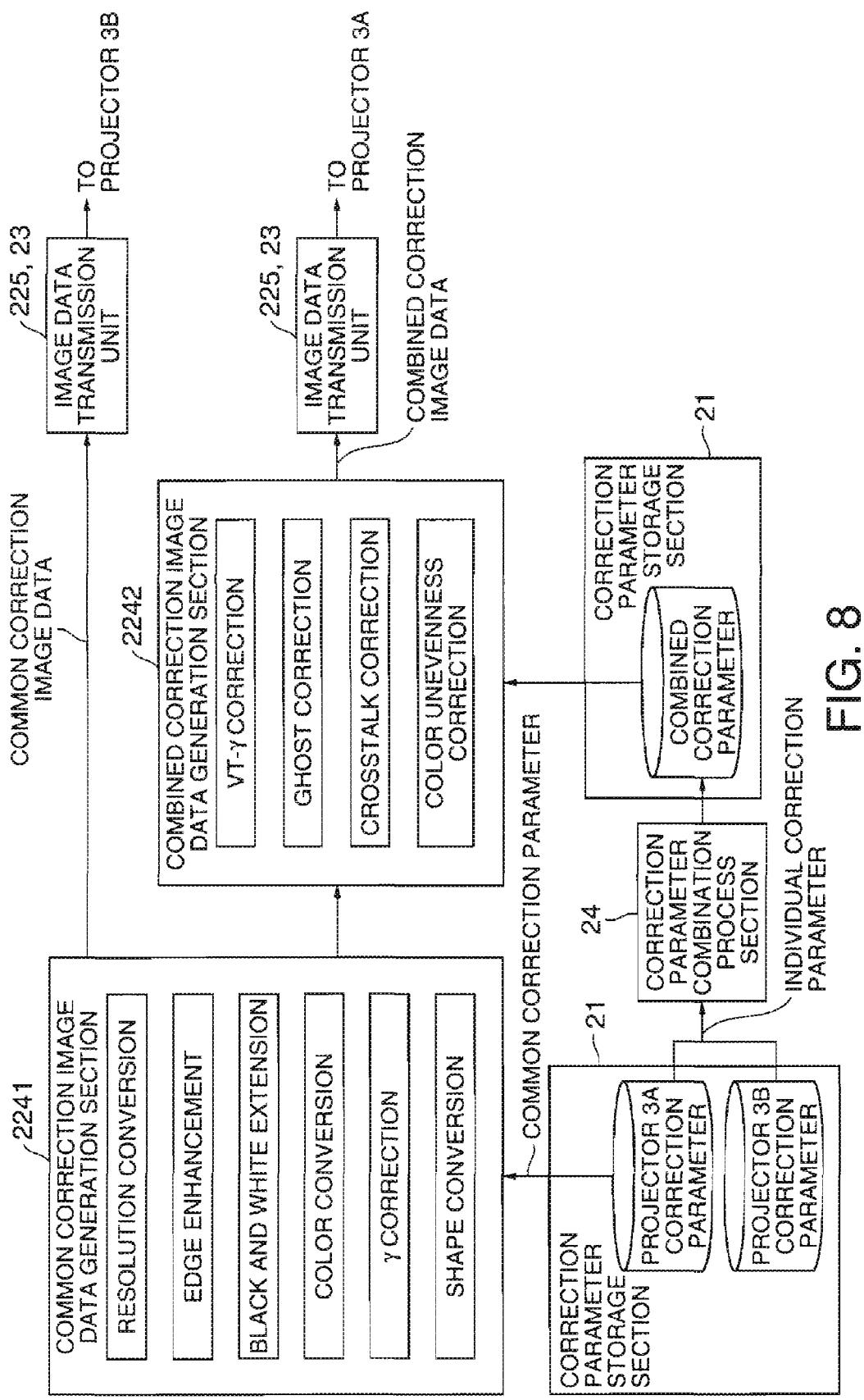
FIG. 8 is a diagram showing the relationship between the process flow in a correction parameter combination process section and that in an image correction operation process section in the first embodiment.

FIG. 8 is a diagram showing the relationship between the process flow in the correction parameter combination process section 24 and that in the image correction operation process section 224.

In this embodiment, as shown in FIG. 8, the common correction image data generation section 2241 performs image correction, i.e., resolution conversion, edge enhancement, black and white extension, color conversion, γ correction, and shape conversion, based on the common correction parameter. The combined correction image data generation section 2242 performs image correction, i.e., VT-γ correction, crosstalk correction, ghost correction, and color unevenness correction, based on the combined correction parameter.

Then in ST7, the encoder 225 calculates a difference between image frames of the common correction image data generated by the common correction image data generation section 2241, and detects any portion with a change as differential data. The encoder 225 also calculates a difference between image frames of the combined correction image data generated by the combined correction image data generation section 2242, and detects any portion with a change as differential data.

Then in ST8, the encoder 225 encodes both the differential data detected as such.

Then in ST9, the PC 2 transmits the combined correction image data being the encoding result to the projector 3A over the USB cable 4A. The PC 2 also transmits the common correction image data being the encoding result to the projector 3B via the USB cable 4B.

Note that in this embodiment, the procedure of image data transmission includes ST7 to ST9.

After receiving the differential data, the projectors 3A and 3B go through the following ST10 to ST13.

First of all, in ST10, the decoder 322 decodes the differential data being the encoding result provided by the PC 2.

Then in ST11, the current image generation section 323 combines the differential data being the decoding result of the decoder 322 with the currently-projected image data so that a new current image frame is generated.

Then in ST12, the drive control section 35 forwards a control signal to the image projection section 36 to make it display thereon the current image frame through with image correction.

Then in ST13, the image projection section 36 extends and projects an image toward the screen 5 so that the image is displayed on the screen 5.

According to the projection system 1 of the first embodiment, the following effects and advantages are achieved.

1. At the time of stack projection using a plurality of projectors, the PC 2 transmits the combined correction image data to any one of the projectors, i.e. the projector 3A, and transmits the common correction image data to the remaining projector(s), i.e., the projector 3B. As such, the projector 3A accordingly projects the combined correction image data factored with the image correction applied to every projector. Therefore, even if the projector 3B projects the common correction image data, the resulting stack projection can be performed with an appropriate level.

2. The projectors 3A and 3B simply project the image data with no complicated image correction so that the configuration of the projectors can be simplified, and the image correction can be performed all at once based on a combined correction parameter and a common correction parameter. As such, the load to be imposed on the PC 2 can be also reduced.

Second Embodiment

Described next is a projection system in a second embodiment of the invention.

In the below, any component already described is provided with the same reference numeral, and is not described again.

In the projection system 1 of the first embodiment, a user of the projection system 1 adjusts the display position and shape when the projectors 3A and 3B perform stack projection. On the other hand, in the projection system 1 of the second embodiment, the PC 2 is the one adjusting the display position and shape when the projectors 3A and 3B perform stack projection.

Figure 9:
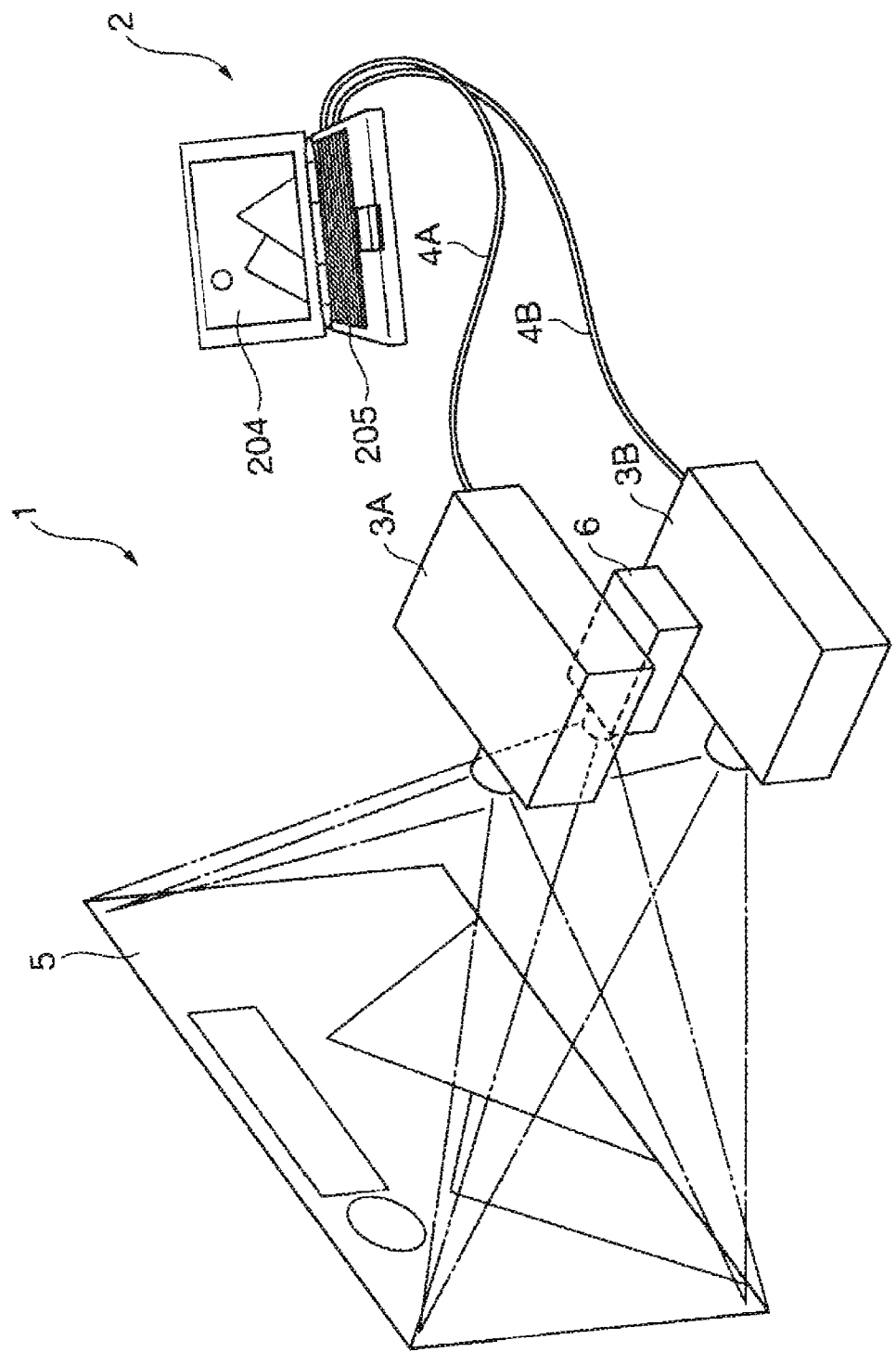
FIG. 9 is a diagram showing the external view of a projection system in a second embodiment of the invention.

As shown in FIG. 9, the projection system 1 of the second embodiment is connected to the PC 2, and is configured to include a CCD camera 6, which is disposed at the midpoint between the projectors 3A and 3B.

Based on information about an image captured by the CCD camera 6, the PC 2 automatically adjusts the display position and shape when the protectors 3A and 3B perform stack projection.

Figure 10:
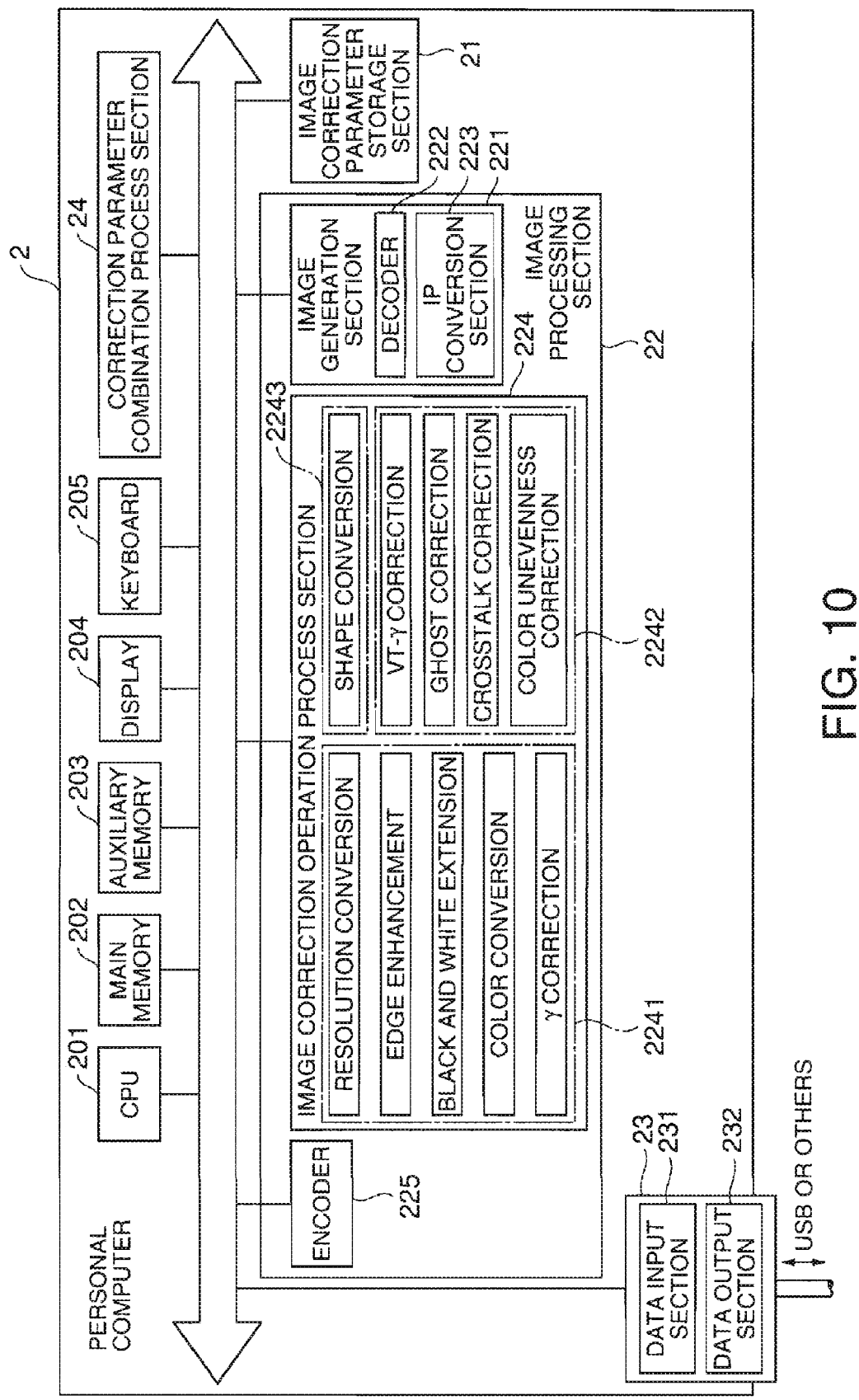
FIG. 10 is a function block diagram of a personal computer in the second embodiment.

In the projection system 1 of the first embodiment, a common correction parameter is the correction parameter for shape conversion, and the common correction image data generation section 2241 is in charge of shape conversion. On the other hand, in the second embodiment, as shown in FIG. 10, the correction parameter for shape conversion is an individual correction parameter, and an individual correction image data generation section 2243 is in charge of shape conversion.

For more details, considered here is a case where the projectors are each capable of lens shifting, and using the lens shifting function, are each allowed to move parallel its projection image at the time of stack projection. In such a case, image correction is required due to any common cause, e.g., tilting screen, and in this sense, the correction parameter for shape conversion can be regarded as a common correction parameter. When the projectors are each required to be individually subjected to shape conversion, on the other hand, the correction parameter has to be an individual correction parameter.

Described next is the operation of the projection system 1 of the second embodiment by referring to the flowchart of FIG. 11, and FIG. 12.

Figure 11:
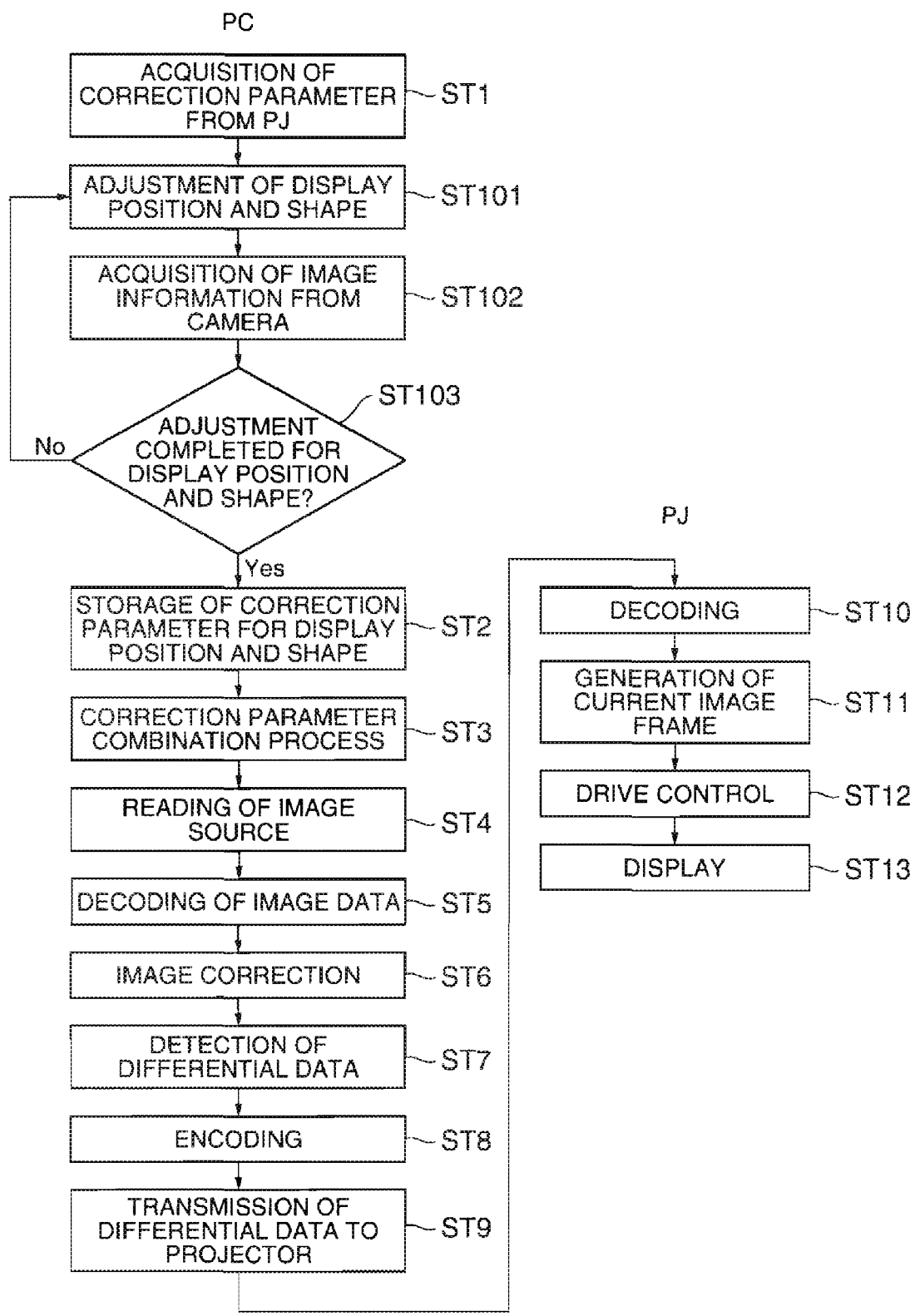
FIG. 11 is a flowchart of the operation of the projection system in the first embodiment.

As shown in FIG. 11, in the projection system 1 of the second embodiment, in ST101, the PC 2 operates the projectors 3A and 3B by forwarding a control signal so that the display position and shape are adjusted.

Then in ST102, the PC 2 acquires information about an image captured by the CCD camera 6.

Then in ST103, the PC 2 determines whether the adjustment is through for the display posit on and shape based on the information about the image captured by the CCD camera 6.

Then in ST2, based on the information about the image captured by the CCD camera 6, the image correction parameter storage section 21 stores therein a correction parameter as an individual correction parameter. The correction parameter here is the one for use for shape conversion based on the adjustment made for the display position and shape at the time of stack projection by the projectors 3A and 3B.

Then in ST6, the combined correction image data generation section 2242 applies image correction to the common correction image data so that combined correction image data is generated. This image correction is applied based on a combined correction parameter being the combination result of the correction parameter combination process section 24, and an individual correction parameter for use for shape conversion related to the projector 3A. The individual correction image data generation section 2243 applies image correction to the common correction image data so that individual correction image data is generated. This image correction is applied based on an individual correction parameter for use for shape conversion related to the projector 3B.

Figure 12:
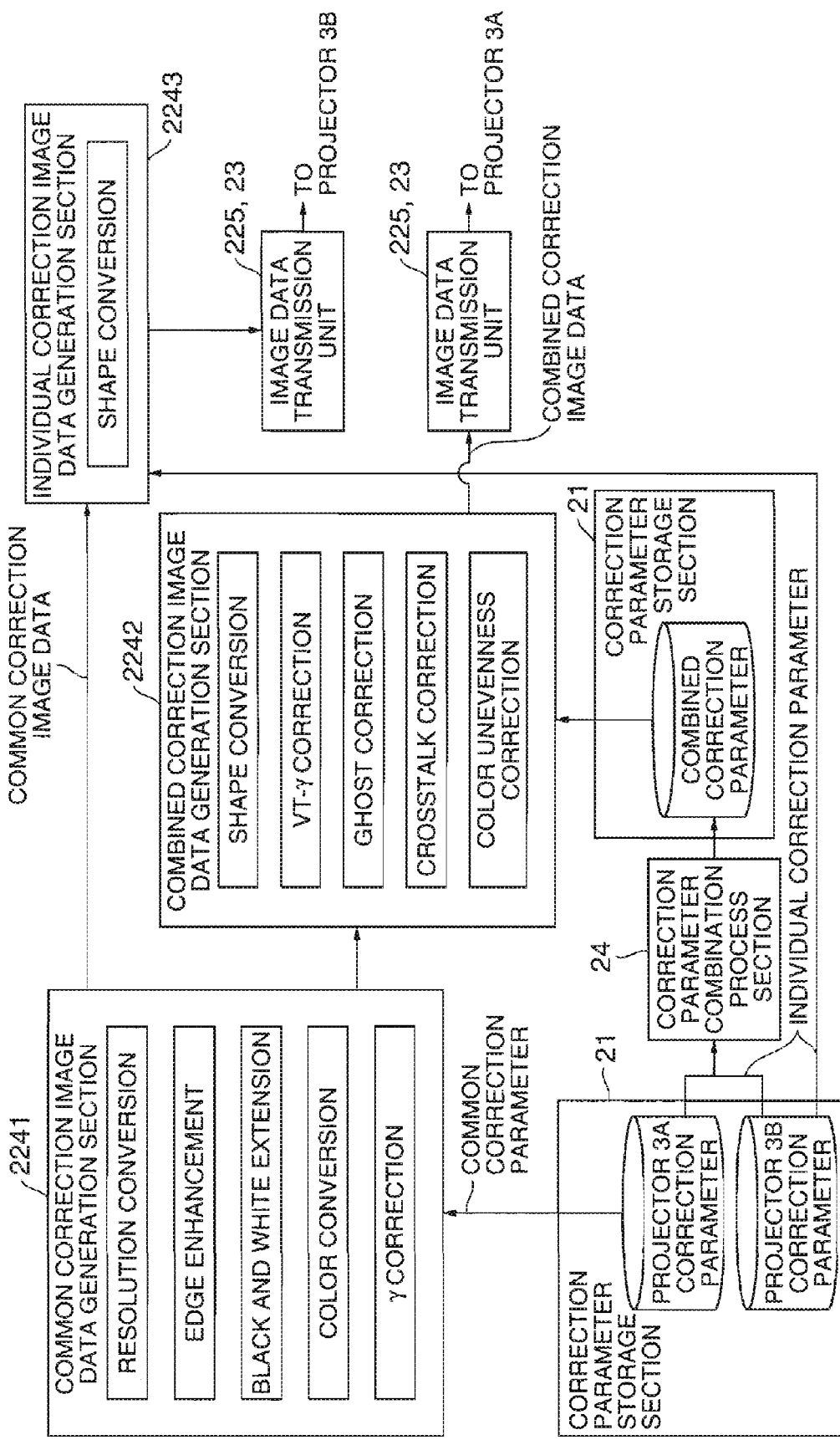
FIG. 12 is a diagram showing the relationship between the process flow in a correction parameter combination process section and that in an image correction operation process section in the first embodiment.

FIG. 12 is a diagram showing the relationship between the process flow in the correction parameter combination process section 24 and that in the image correction operation process section 224.

In this embodiment, as shown in FIG. 12, the common correction image data generation section 2241 performs image correction, i.e., resolution conversion, edge enhancement, black and white extension, color conversion, and γ correction, based on the common correction parameter. The combined correction image data generation section 2242 performs image correction, i.e., VT-γ correction, crosstalk correction, ghost correction, and color unevenness correction based on the combined correction parameter. The individual correction image data generation unit 2243 performs shape conversion.

Then in ST9, the PC 2 transmits the combined correction image data being the encoding result to the projector 3A over the USB cable 4A, and transmits the individual correction image data being the encoding result to the projector 3B over the USB cable 4B.

By referring to FIGS. 13A to 15B, described next in detail is the operation of the combined correction image data generation section 2242 and that of the individual correction image data generation section 2243 in the second embodiment.

Figure 13A:
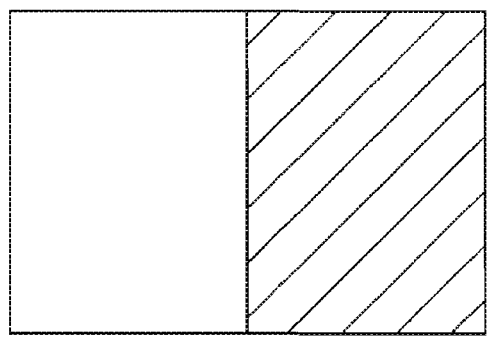
FIGS. 13A to 13D are each a diagram showing an exemplary individual correction parameter in the first embodiment.
Figure 13B:
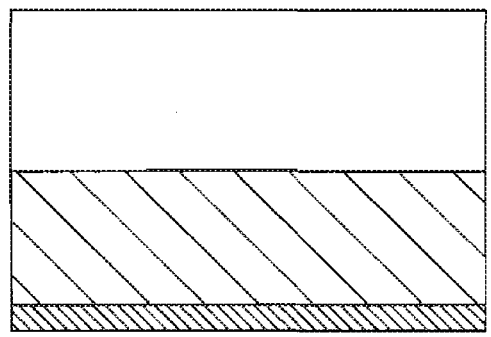

FIG. 13A shows an individual correction parameter for use for color unevenness correction related to the projector 3A, and FIG. 13B shows an individual correction parameter for use for color unevenness correction related to the projector 3B.

In FIGS. 13A and 13B, the shaded portions are those for brightness correction in the image data.

Figure 13C:
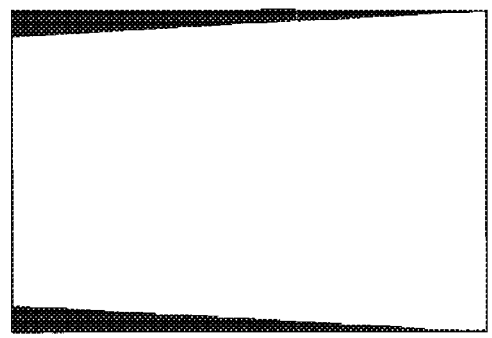
Figure 13D:
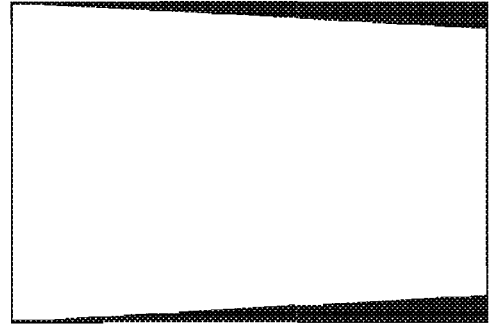

FIG. 13C shows an individual correction parameter for use for shape correction related to the projector 3A, and FIG. 13D shows an individual correction parameter for use for shape correction related to the projector 3B.

That is, presumably, an image to be displayed by the projector 3A is shaped like a trapezoid with the right end shorter than the left end. On the other hand, an image to be displayed by the projector 3B is also shaped like a trapezoid but with the right end longer than the left end.

In FIGS. 13C and 13D, the portions filled with black are those for black display for the aim of blocking luminous fluxes.

The correction parameter combination process section 24 combines the individual correction parameters of FIGS. 13A, 13B, and 13C with the individual correction parameter for use for shape conversion related to the projector 3A, thereby generating a combined correction parameter for storage in the image correction parameter storage section 21. The individual correction parameters of FIGS. 13A, 13B, and 13C are those for use for color unevenness correction related to the projectors 3A and 3B.

Figure 14A:
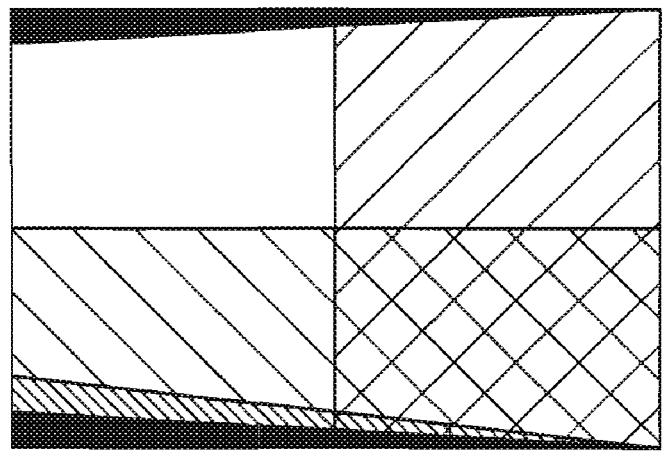
FIGS. 14A and 14B are diagrams showing exemplary combined correction image data and individual correction image data, respectively.
Figure 15A:
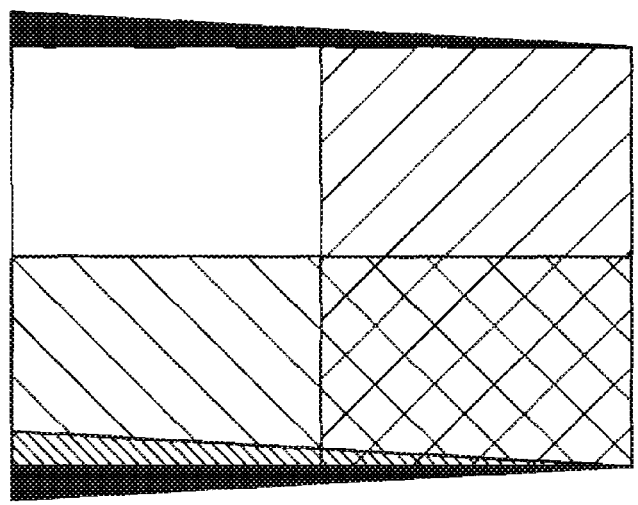
FIGS. 15A and 15B are each a diagram showing an image to be displayed by a projector in the second embodiment.

The combined correction image data generation section 2242 applies image correction to the common correction image data so that combined correction image data is generated. This image correction is applied based on the combined correction parameter being the combination result of the correction parameter combination process section 24. This combined correction image data is as shown in FIG. 14A. FIG. 15A shows an image projected by the projector 3A onto the screen based on the combined correction image data.

Figure 14B:
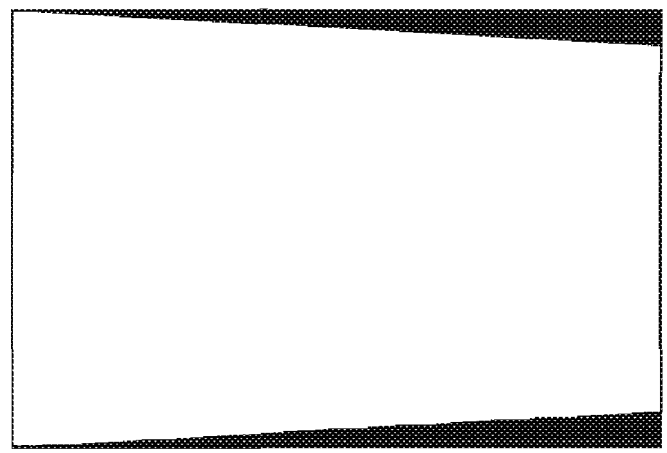
Figure 15B:
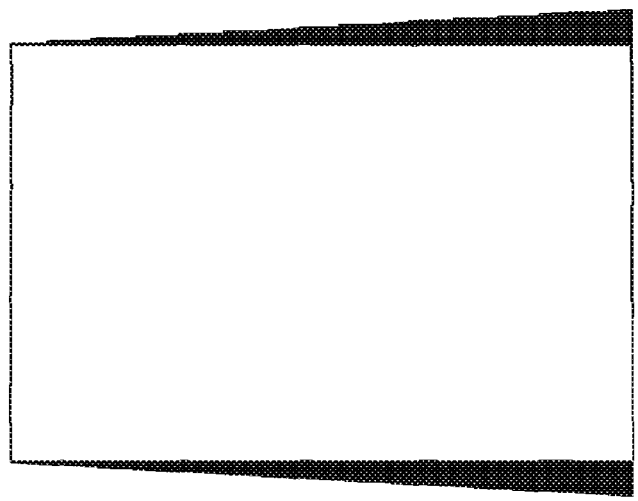

The individual correction image data generation section 2243 applies image correction to the common correction image data so that individual correction image data is generated. This image correction is applied based on an individual correction parameter of FIG. 13D, i.e., the individual correction parameter for use for shape correction related to the projector 3B. This individual correction image data is as shown in FIG. 14B. FIG. 15B shows an image projected by the projector 3B onto the screen based on the combined correction image data.

This thus enables appropriate image display on the screen 5 by the projectors 3A and 3B.

The second embodiment as such can derive the effects and advantages similar to those of the first embodiment above.

Moreover, even if the correction parameter for use for shape conversion takes an extreme value, by the projector 3B projecting the individual correction image data through with shape conversion, the projection system 1 in its entirety can perform image correction of a satisfactory level.

Third Embodiment

Described now is a projection system of a third embodiment of the invention.

Figure 16:
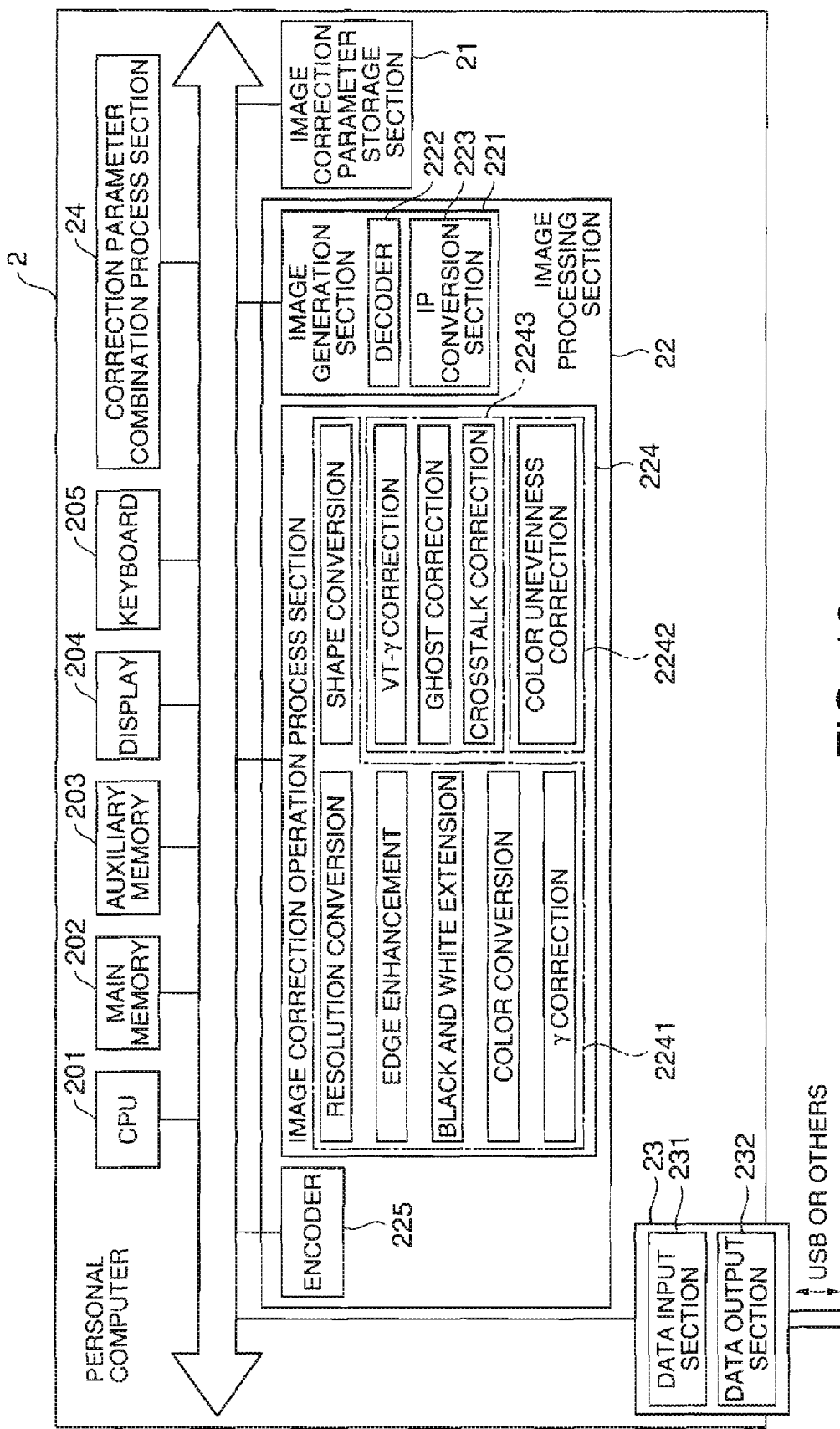
FIG. 16 is a function block diagram of the personal computer in the second embodiment.
Figure 17:
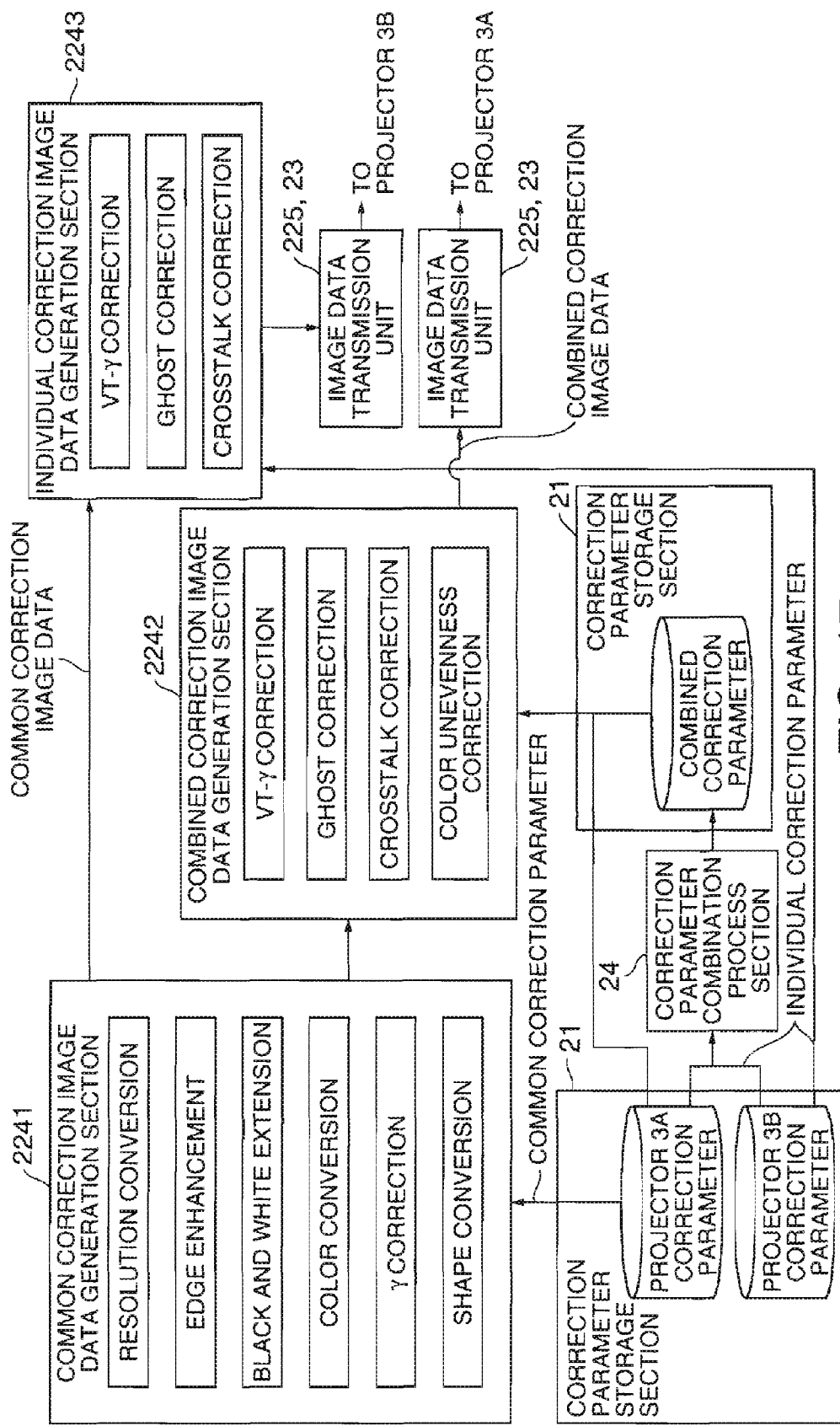
FIG. 17 is a diagram showing the relationship between the process flow in a correction parameter combination process section and that in an image correction operation process section in a third embodiment of the invention.

Compared with the projection system 1 of the first embodiment in which the combined correction image data generation section 242 takes charge of image correction, i.e., VT-γ correction, crosstalk correction, and ghost correction, in the projection system 1 of the third embodiment, as shown in FIGS. 16 and 17, the individual correction image data generation section 2243 takes charge of image correction, i.e., VT-γ correction, crosstalk correction, and ghost correction.

That is, in the third embodiment, the correction parameter combination process section 24 calculates a combined correction parameter by combining only the individual correction parameters for use for color unevenness correction.

The combined correction image data generation section 2242 then applies image correction to the common correction image data so that combined correction image data is generated. The image correction is applied based on the combined correction parameter being the combination result of the correction parameter combination process section 24, and the individual correction parameter for use for VT-γ correction, crosstalk correction, and ghost correction related to the projector 3A. The individual correction image data generation section 2243 applies image correction to the common correction image data so that individual correction image data is generated. The image correction is applied based on the individual correction parameter for use for VT-γ correction, crosstalk correction, and ghost correction related to the projector 3B.

The third embodiment as such can derive the effects and advantages similar to those of the first embodiment above.

Moreover, even if the correction parameter for use for VT-γ correction, crosstalk correction, and ghost correction takes an extreme value, by the projector 3B projecting the individual correction image data through with image correction, i.e., VT-γ correction, crosstalk correction, and ghost correction, the projection system 1 in its entirety can perform image correction of a satisfactory level.

Fourth Embodiment

Described next is a projection system of a fourth embodiment of the invention.

Figure 18:
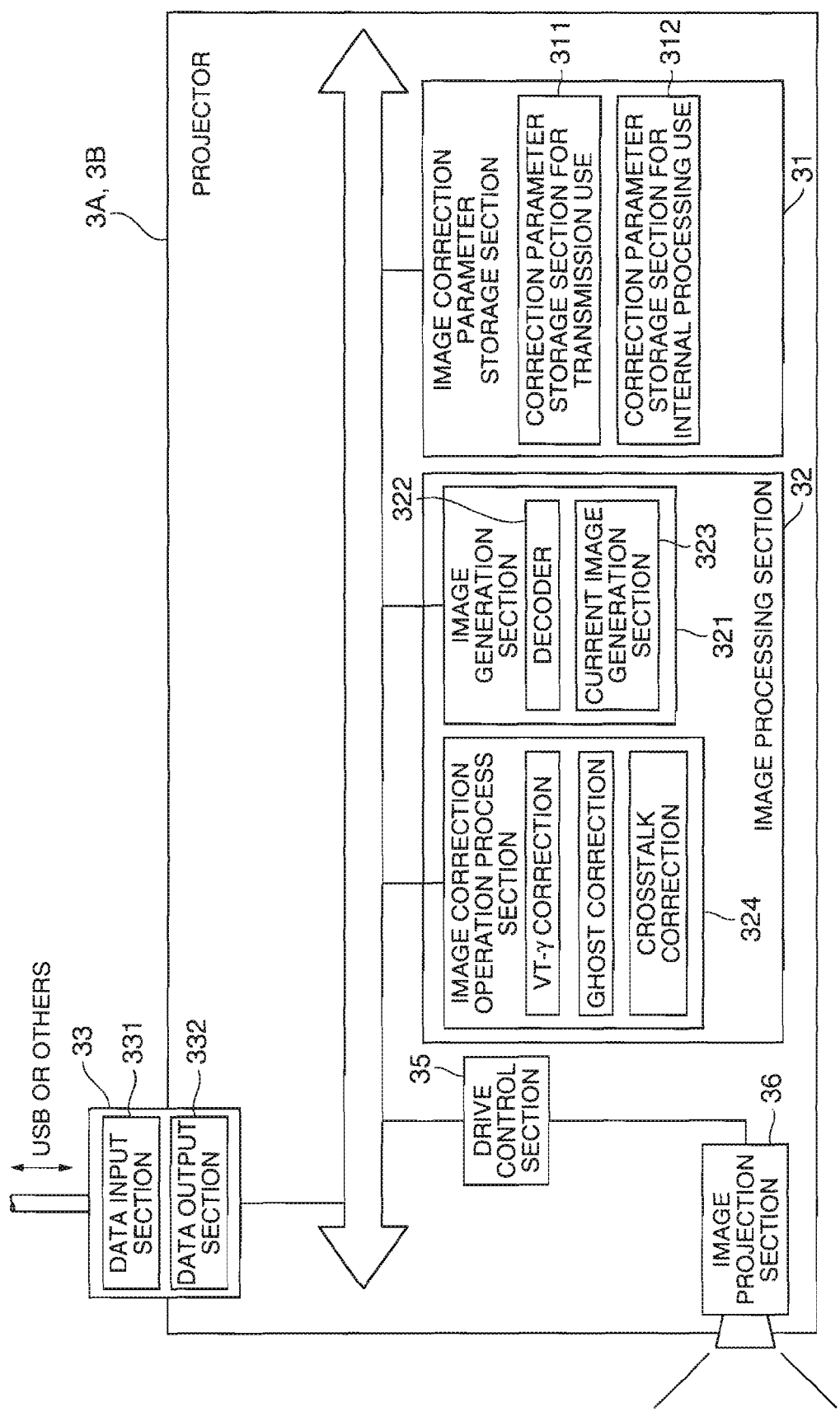
FIG. 18 is a function block diagram of a projector in a fourth embodiment of the invention.

Compared with the projection system 1 of the third embodiment in which the individual correction image data generation section 2243 of the PC 2 takes charge of image correction, i.e., VT-γ correction, crosstalk correction, and ghost correction, in the projection system 1 of the fourth embodiment, as shown in FIG. 18, an image correction operation process section 324 provided to each of the projectors 3A and 3B takes charge of image correction, i.e., VT-γ correction, crosstalk correction, and ghost correction.

The image correction operation process section 324 applies image correction, individually, to a current image frame generated by the current image generation section 323 based on an individual correction parameter stored in the correction parameter storage section 312 for internal processing use.

As such, in the PC 2, the correction parameter combination process section 24 combines only the individual correction parameters for use or color unevenness correction so that a combined correction parameter is calculated.

The common correction image data generation section 2241 performs image correction based on a common correction parameter so that common correction image data is generated. The combined correction image data generation section 2242 performs image correction based on the combined correction parameter generated by the correction parameter combination process section 24 so that combined correction image data is generated.

The fourth embodiment as such can derive the effects and advantages similar to those of the third embodiment above.

Moreover, by the image correction operation process sections 324 of the projectors 3A and 3B performing image correction, i.e., VT-γ correction, crosstalk correction, and ghost correction, the projectors can be simplified in configuration, and the load possible imposed on the information processing device can be reduced to a further degree compared with the third embodiment.

As an alternative to the configuration of the fourth embodiment in which the image correction operation process section 324 of the projectors 3A and 3B perform image correction, i.e., VT-γ correction, crosstalk correction, and ghost correction, the image correction may be performed either the PC 2 or the projectors. A determination factor therefor may be the capability and performance of the components of the projection system 1, i.e., the PC 2, the projectors, and the USB cables 4A and 4B.

Fifth Embodiment

Described next is a projection system of a fifth embodiment of the invention.

The projection system of the fifth embodiment is a combination of the projection systems 1 of the second and third embodiments.

Figure 19:
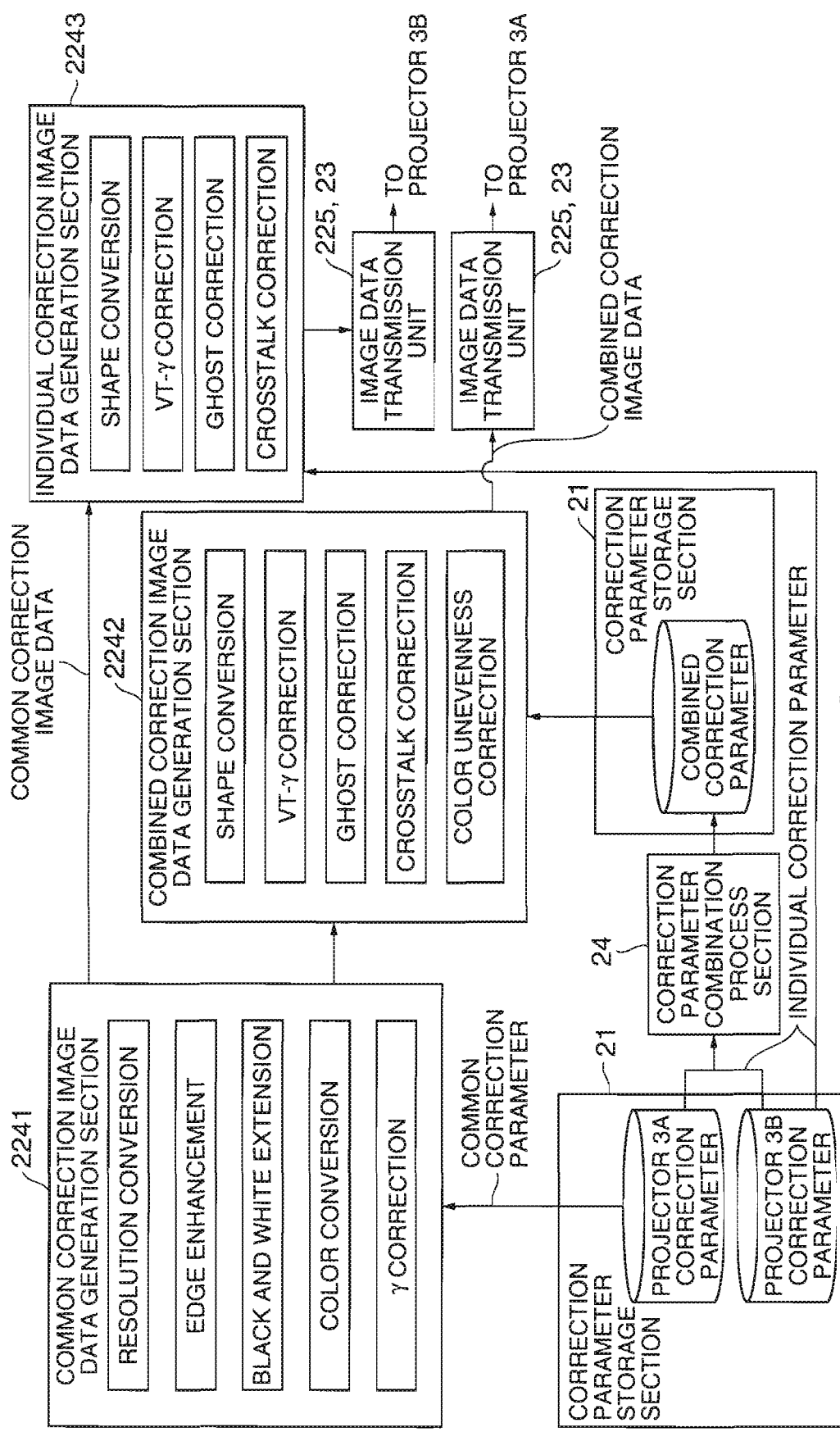
FIG. 19 is a diagram showing the relationship between the process flow in a correction parameter combination process section and that in an image correction operation process section a fifth embodiment of the invention.

That is, as shown in FIG. 19, the individual correction image data generation section 2243 takes charge of image correction of shape conversion, VT-γ correction, crosstalk correction, and ghost correction.

The fifth embodiment as such can derive the effects and advantages similar to those of the second and third embodiment above.

Note here that the invention is not surely restrictive to the embodiments described above, and any possible modifications and variations in the scope of implementing the invention are all included in the invention.

In the above, the stack projection is performed using the two projectors 3A and 3B. Alternatively, two or more projectors may be used, i.e., the number of projectors may be determined based on the environment in which the projection system is used.

Moreover, a common correction parameter and an individual correction parameter are not restrictive to those exemplified above, and if with the correction parameter exemplified above, it can be a common correction parameter or an individual correction parameter as required, i.e., any correction parameter will do as long as the projection system in its entirety can achieve appropriate display.

In the above, the information processing device is the PC 2, but may be a board computer or others, i.e., any will do as long as the information processing device can generate image data for output by applying any predetermined image correction to an incoming image source.

Further, although the USB cables 4A and 4B are used in the above embodiments, alternatively, an IEEE1394 cable or a DVI cable is also a possible option. Still alternatively, any radio signal transmitter is also a possibility, i.e., any will do as long as it can transmit image data to be generated by an information processing device.

In the above, the encoder 225 calculates a difference between image frames, and detects any portion with a change as differential data, i.e., transmission data. Alternatively, any other data format will do, and the image data may be used as transmission data as it is, i.e., any will do as long as it can transmit image data to every projector via a signal transmitter.

The entire disclosure of Japanese Patent Application No. 2006-237371, filed Sep. 1, 2006 is expressly incorporated by reference herein.

What is claimed is:

1. An information processing device, comprising:
a correction parameter storage unit that stores therein an individual correction parameter for each of a plurality of projectors connected to the information processing device for use to individually perform an image correction process of enabling appropriate image display by each of the projectors;
a correction parameter combination process unit that calculates a combined correction parameter by combining together the individual correction parameters for the projectors;
a combined correction image data generation unit that generates combined correction image data by performing the image correction process with respect to an incoming image source based on the combined correction parameter; and
an image data transmission unit that transmits the combined correction image data to any of the projectors.

2. The information processing device according to claim 1, wherein
the correction parameter storage unit stores therein a common correction parameter for use to commonly perform the image correction process of enabling appropriate image display by each of the projectors,
a common correction image data generation unit is included for generating common correction image data by performing the image correction process with respect to the image source based on the common correction parameter, and
the image data transmission unit transmits the common correction image data to any of the projectors that is not provided with the combined correction image data.

3. The information processing device according to claim 1, wherein
the correction parameter storage unit stores therein the individual correction parameter not being a combination result of the correction parameter combination process unit,
an individual correction image data generation unit is included for generating, with respect to the image source, individual correction image data for each of the projectors based on the individual correction parameter not being the combination result of the correction parameter combination process unit, and
the image data transmission unit transmits the individual correction image data generated for each of the projectors to any of the projectors not provided with the combined correction data.

4. The information processing device according to claim 1, wherein
the correction parameter storage unit stores therein a common correction parameter for use to commonly perform the image correction process of enabling appropriate image display by each of the projectors, and the individual correction parameter not being the combination result of the correction parameter combination process unit,
a common correction image data generation unit is included for generating common correction image data by performing the image correction process with respect to the image source based on the common correction parameter,
an individual correction data generation unit that generates individual correction image data for each of the projectors based on the individual correction parameter not being a combination result of the correction parameter combination process unit with respect to the common correction image data generated by the common correction image data generation unit, and
the image data transmission unit transmits the individual correction image data generated for each of the projectors to any of the projectors not provided with the combined correction data.

5. The information processing device according to claim 3, wherein
the individual correction parameter not being the combination result of the correction parameter combination process unit is for shape conversion correction, VT-g correction, ghost correction, or crosstalk correction.

6. A computer program product comprising a non-transitory computer readable medium encoded with an information processing program for use in an information processing device, the program when executed performs the operations comprising:

storing, by the information processing device, an individual correction parameter for each of a plurality of projectors connected to the information processing device for use to individually perform an image correction process of enabling appropriate image display by each of the projectors;

calculating, by the information processing device, a combined correction parameter by combining together the individual correction parameters for the projectors;

generating, by the information processing device, combined correction image data by performing the image correction process with respect to an incoming image source based on the combined correction parameter; and transmitting, by the information processing device, the combined correction image data to any of the projectors.

\* \* \* \* \*